INVENTOR.
Thomas C. Fanshier,

Nov. 11, 1941. T. C. FANSHIER 2,262,671
MOTOR DRIVEN FISHING REEL
Filed July 6, 1939 2 Sheets-Sheet 2
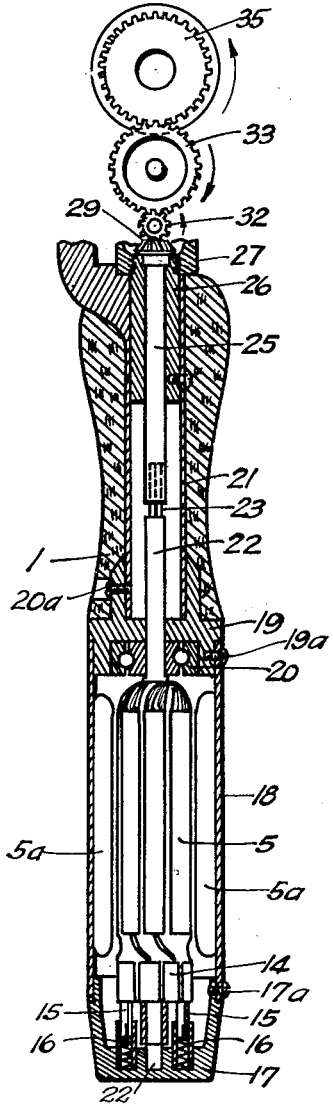
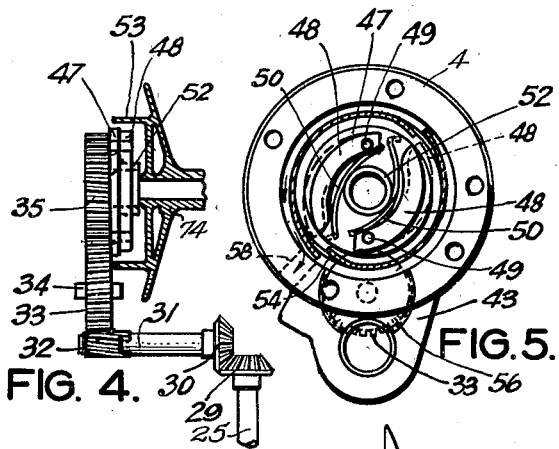
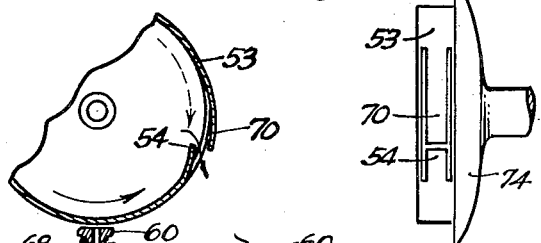
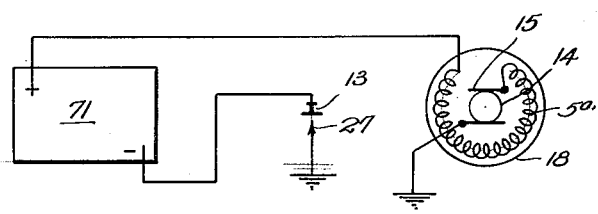
Thomas C. Fanshier INVENTOR.

Patented Nov. 11, 1941

2,262,671

UNITED STATES PATENT OFFICE 2,262,671

MOTOR DRIVEN FISHING REEL

Thomas C. Fanshier, Oklahoma City, Okla.

Application July 6, 1939, Serial No. 283,029

3 Claims. (Cl. 43—21)

This invention relates to a motor driven fishing reel, and particularly to a motor-drive attachment for mounting on an ordinary fishing rod for driving an ordinary fishing reel.

It is the chief object of my invention to provide an improvement over my other inventions for motor driven fishing reels covered respectively by my patent applications Serial No. 268,299 and Serial No. 277,385, filed April 17, 1939, and June 5, 1939, respectively.

The details in the construction of the preferred improvements in this invention, together with other objects attending its production, will be better understood when read in connection with the accompanying drawings which are chosen for illustrative purposes only, and the following description in which, Figure 1 is a side elevation of an ordinary fishing rod and reel with my invention installed thereon, the dotted lines showing certain details of construction and installation.

Figure 3 is a partial diagrammatic and partial sectional view showing the constructional details of the driving connections between the motor and the reel.

Figure 4 is a side view, partially in section, of the driving connections illustrated in Figure 3.

Figure 5 is an internal view of the gear case, and shows particularly certain details of construction of a preferred form of a clutch which is a part of the invention.

Figure 6 is a side view of the clutch drum in position at one end of the reel spool.

Figures 7 and 8 are similar sectional views showing the details of construction of a preferred form of brake which is a part of the invention.

Figure 9 is a diagrammatical view of the motor circuit.

Like characters of reference designate like parts in all the figures.

Figure 1:
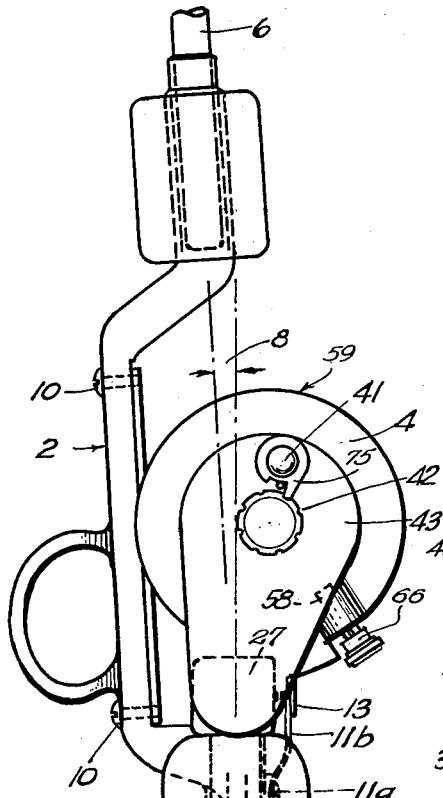

The invention generally includes an electric motor, preferably DC series wound, housed in the handle of an ordinary fishing rod, and so mounted that its housing serves as a portion of the handle thereof; a system of gearing driven directly from the motor shaft; a centrifugal clutch serving as a means for transmitting rotary motion from one of the gears in said gearing to the reel spool of an ordinary reel; a brake for regulating the speed of the reel spool; and an air compressor feature in conjunction with the clutch drum serving as a means for preventing backlash as the reel unwinds.

Referring particularly to Figure 3, the numeral 21 designates a metal sleeve which is a part of the handle of an ordinary casting rod, the rod being designated as a whole by the numeral 2. I provide an adapter 19, one end of which is recessed to fit over the end of the sleeve 21, the other end of which is provided with a shoulder against which one end of the motor housing 18 abuts. The adapter is held in position on the sleeve 21 by means of screws 20a, while the motor housing is held in position on the opposite end of the adapter 19 by means of screws 19a, as shown. A recess is provided in the adapter for a motor shaft bearing race 20, and the motor shaft 22 is journaled in this race 20 and extends through a central bore in the adapter into the interior of the sleeve 21. A suitable handle covering 1 may be provided for the sleeve 21 and a portion of the adapter 19.

In Figure 3 the numeral 5 designates the motor armature; the numeral 5A designates the motor field coil; the numeral 17 designates a combination brush holding head and journal for the opposite end of the motor shaft 22; the numerals 15 designate a pair of identical brushes; the numerals 16 designate a pair of motor brush springs which normally tend to maintain the ends of the brushes 15 against the motor commutator 14; and the numeral 17a designates set screws which serve to hold the head 17 in position on the end of the motor housing 18.

Figure 2:
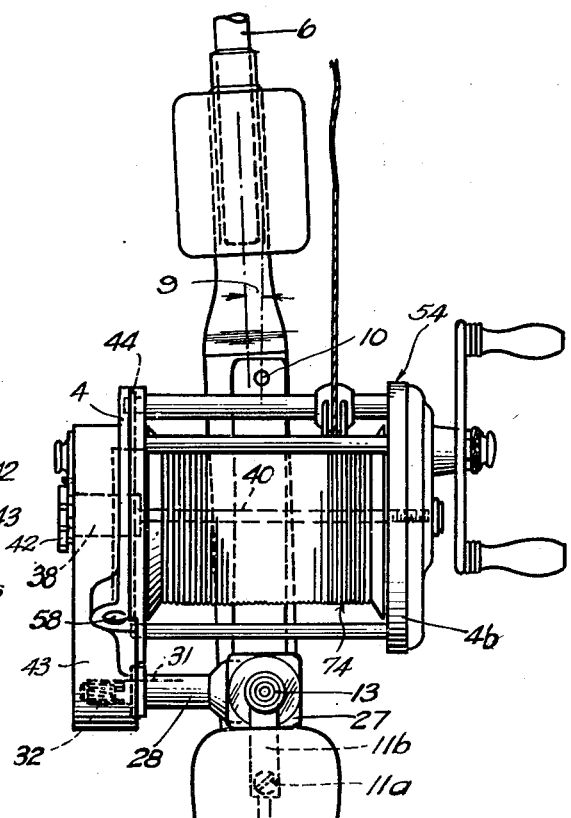
Figure 2 is a plan view of the invention installed on an ordinary rod and reel.

In Figures 1 and 2, an ordinary fishing reel is designated as a whole by the numeral 59. The ordinary gear case of such a reel is designated by the numeral 4b and the end plate at the opposite end of the reel is designated as a whole by the numeral 44. Such a reel is ordinarily secured to the offset portion of the rod 2 by means of screws 10. The space designated by the numeral 8 in Figure 1 (between the broken lines) simply shows that the axis of the handle is preferably at a very slight angle to the axis of the rod portion 6 of the casting rod. Likewise, the space designated by the numeral 9 is Figure 2 shows that the axis of the handle is slightly offset to the left with relation to the axis of the rod 6. This manner of mounting the handle is not unusual and is not necessarily a part of my invention. It simply facilitates casting with the rod as it gives the rod better balance.

As a means of transmitting power from the electric motor previously mentioned, to the reel spool 74, I provide a gear case 43 which has an integral flange 4 of a shape to complementally fit flat against the end plate 44 of an ordinary fishing reel. The flange is perforated to facilitate its connection to the end plate 44 by means of a plurality of screws, or is preferably held in position by means of a large spindle bolt 40, as shown, and as will be hereinafter described. A comparatively large perforation is cut in the end plate 44 of the ordinary reel so as to allow free communication between the interior of the gear case and the end of the reel spool. The reel spool 74 ordinarily rotates on a small spindle whose ends are respectively mounted in the end plate 44 and in the gear case 4b. This spindle is removed and a similarly sized spindle 40 is substituted. As will be seen from Figure 2, the spindle 40 is provided with an enlarged shank portion 38 at one of its ends. It is also provided with an enlarged head 42, which head, when the spindle 40 is screwed into position, serves as a means of maintaining the gear case 43 in position against the surface of the end plate 44. The enlarged shank portion 38 of the spindle 40 serves as an axle shaft for a spool driving gear 35. The gear 35 meshes with an idler gear 33 (Figures 3 and 4), which gear in turn meshes with a pinion 32. This gear 33 rotates freely on a shaft 34, one end of which is journaled in a boss on the interior wall of the gear case 43, and the opposite end of which is journaled in a boss formed on the interior surface of the flange 4 within the gear case. The pinion 32 is rigidly secured in any suitable manner on the end of a short stub shaft 31, which is journaled in a housing 28. On the opposite end of this shaft 31 is a beveled gear 30 which meshes with a similar beveled gear 29. The gear 29 is fixed on one end of a shaft 25 which is journaled in a sleeve journal 26, located at one end of the handle sleeve 21. The opposite end of the shaft 25, together with the adjacent end of the motor shaft 22, are each provided with a comparatively shallow recess of irregular cross section. A key of complemental cross sectional shape is used to rotatably connect the shafts 25 and 22. Such an arrangement permits easy removal of the motor housing 18 and the motor without in any way interfering with the gearing previously mentioned. A small gear housing is provided for the beveled gears 29 and 30. This housing 27 screws onto one end of the sleeve journal 26, as shown in Figure 3. One end of the housing 28 screws into one side of the housing 27.

On one of its side surfaces the gear 35 is provided with a concentric disc or plate 47 which in turn is provided with a concentric hub 52, the interior bore of which snugly fits the shaft 38 and rotates freely thereon. A pair of arcuate clutch dogs 48 are pivotally mounted by means of pins 49 (Figure 5) on the plate 47. Between each of these dogs and the hub 52 is mounted an arcuate spring 50. These springs are rigidly mounted at the end remote from the pins 49, and the ends of the springs which are adjacent the pins 49 press against the inner edge of the arcuate dogs. Since the springs are normally substantially straight their curvature around the hub 52 causes the free ends to press against the pivoted ends of the dogs and forces the opposite ends of the dogs toward the hub. In other words these springs serve to normally maintain the dogs 48 in a retracted position. The springs 50, however, are not sufficiently strong to prevent the free ends of the dogs 48 from pivoting outward, away from the hub 52, due to centrifugal force created by the high speed rotation of the gear 35.

As will be seen in Figure 4, that end of the reel spool 74 which is adjacent the gear 35, is provided with a clutch drum 53 which may be rigidly secured on the end of the reel spool in any suitable manner, as by spot welding. Needless to say, the drum 53 is concentric with the rotational axis of the reel spool and the gear 35. The drum is of such width as to overlap the plane in which the dogs 48 rotate. In alignment with this plane the drum is slotted to form an H slot, as shown in Figure 6, forming two adjacent end to end tongues. As shown in Figure 7, the longer tongue 70 is bent slightly outward while the shorter tongue 54 is bent slightly inward to form a ratchet tooth for contacting the free ends of either of the dogs 48. This drum 53 is preferably slotted in a similar manner in a plurality of places around its periphery so as to form a plurality of internal teeth 54, all pointing in the same direction, as well as a plurality of external tongues 70. The arrow in Figure 7 indicates the direction of rotation of the reel spool (and the clutch drum) during a cast. The dotted arrow in Figure 7 indicates the normal direction of rotation of the gear 35 and its attached dogs 48, with relation to the clutch drum 53, which is attached to the end of the reel spool 74.

With the clutch construction thus described it will be seen that when the gear 35 reaches a sufficiently high rotational speed (approximately 600 R. P. M.) the free ends of the dogs 48 will pivot outward by centrifugal force, and their free ends will come into contact with the inwardly bent tongues or ratchet teeth 54, which contact will force the gear 35 to rotate the reel spool 74.

Referring to Figure 1, it will be seen that the head 42 of the spindle 40 projects outside the gear case 43. The opposite end of the spindle 40 screws into a boss within the gear case 4b. The head 42 of the shaft 40 is provided with a series of notches, as shown, both to facilitate screwing the shaft into its proper position and also to prevent its being inadvertently loosened during operation of the reel. This is accomplished by means of a pawl 75 pivoted on a pin 41 on the exterior of the gear case 43. After the spindle 40 has been screwed tightly into position the pawl 75 is simply pushed into one of the notches in the head 42. The pawl may be released manually at any time desired in order to remove the spindle 40. The head 42, when the spindle is seated, contacts the exterior surface of the gear case 43 and holds the gear case in position against an end plate 44.

On the exterior of the flange 4 I provide a small, substantially cylindrical housing 58 which is in alignment with the plane in which the drum 53 rotates. Referring particularly to Figures 7 and 8 I will describe a preferred form of brake construction. This housing 58 serves as a means of holding the brake in proper position to contact the drum 53. The brake includes an operating button 66 which telescopically fits over a sleeve 63. This sleeve is slotted with a pair of oppositely positioned slots 64, which are of sufficient width to slidably receive a pin 65, the opposite ends of which are secured in the wall of the button 66 as shown. Diametrically opposite these slots 64 the sleeve 63 is provided with a pair of oppositely positioned shallow slots or indentations 67. The same end of the sleeve 63 is provided with an interior annular shoulder 62, against which one end of a compression spring 61 bears. The opposite end of the spring bears against an enlarged brake shoe 60 which is integral with a hollow sleeve 68. It will be seen that when the end of the sleeve 63 is positioned in the housing 58 the shoe will be pressed against the exterior surface of the drum 53 by the spring 61, provided the button 66 is rotated to a position to allow the pin 65 to enter the slots 64 in the sleeve. The spring pressure, coupled with the contact of the brake shoe 60 against the surface of the drum will, of course, serve to slow the speed of the drum and of the reel spool 74. When the head is grasped and pulled outward, the pin 65 which passes through perforations in the hollow shaft 68, forces the hollow shaft to move outward. When the pin 65 has moved out of the slots 64 the button 66 may be rotated one-quarter turn and released. The spring tension then seats the pin 65 in the slots 67 on the sleeve 63 and thus holds the brake shoe 60 away from contact with the drum.

As a means of controlling the motor, I provide a switch contact element 11b (Figures 1 and 2), one end of which is rigidly secured to the sleeve 21 by means of a screw 11a and the opposite end of which is fitted with a depressor button 13. This contact element 11b is preferably made of spring steel and is insulated from the sleeve 21. The gear housing 27 serves as the other switch contact element.

As will be seen in Figure 9, one pole of the source of electrical supply 71 is connected directly to one end of the motor field coil. The current passes through the field coil and out into one brush of the motor, through the commutator to the other motor brush, which is grounded. The switch contact element 27 (gear housing 27) is likewise grounded. The current, therefore, passes from the last mentioned motor brush, through the ground, to the contact 27, to the contact 11b, and back to the other pole of the source of current supply. Thumb pressure on the depressor button 13 forces it to contact the gear housing 27 and to complete the electrical circuit. The motor immediately rotates the various gears and when the gear 35 reaches a sufficient speed that centrifugal force causes the free ends of the clutch dogs 48 to move outwardly from the hub 52, these dogs contact the teeth 54 on the drum and begin rotating the reel spool 74 in the direction shown by the dotted arrow in Figure 7.

While I have described and illustrated a specific embodiment of the invention, I am aware that numerous alterations and changes may be made therein and I do not wish to be limited except by the prior art and by the scope of the appended claims.

I claim:

1. A power drive for the reel spool of a fishing rod and reel comprising: an electric motor mounted within the rod handle; a drive gear rotatably mounted adjacent one end of the reel spool and in axial alignment therewith; a clutch drum concentrically fixed on said one end of the reel spool; normally contracted centrifugally expansible means fixed to rotate with said drive gear and adapted when in its expanded form to contact the interior surface of said drum thereby forcing the drum and reel spool to rotate with the drive gear; and gearing affording a driving connection between said motor and said drive gear.

2. A power drive for the reel spool of a fishing rod and reel comprising: an electric motor mounted within the rod handle; a reel mounted on the rod adjacent the handle; a drive gear rotatably mounted adjacent one end of the reel spool in axial alignment therewith; normally retracted centrifugally expansible clutch dogs concentrically mounted to rotate with said drive gear in a plane intermediate the drive gear and the adjacent end of the reel spool; a concentric clutch drum carried by the adjacent end of the reel spool, said drum having internal teeth for engagement by said clutch dogs in their expanded position; and gearing operatively connecting the motor and said drive gear.

3. A power drive for the reel spool of a fishing rod and reel comprising: an electric motor mounted within the rod handle; a drive gear rotatably mounted adjacent one end of the reel spool and in axial alignment therewith; cooperating means responsive to centrifugal force created by the rotation of said gear for effecting a driving connection between the gear and the reel spool; and a gear train forming a driving connection between the motor shaft and said drive gear.

THOMAS C. FANSHIER.